US010609069B2

(12) United States Patent
Ogrinz et al.

(10) Patent No.: US 10,609,069 B2
(45) Date of Patent: Mar. 31, 2020

(54) REFLEXIVE BENIGN SERVICE ATTACK ON IOT DEVICE(S)

(71) Applicant: Bank of America Corporation, Charlotte, NC (US)

(72) Inventors: Michael Ogrinz, Easton, CT (US); David Hsiang, Charlotte, NC (US); John C. Checco, Stony Point, NY (US)

(73) Assignee: Bank of America Corporation, Charlotte, NC (US)

( * ) Notice: Subject to any disclaimer, the term of this patent is extended or adjusted under 35 U.S.C. 154(b) by 293 days.

(21) Appl. No.: 15/903,154

(22) Filed: Feb. 23, 2018

(65) Prior Publication Data

US 2019/0268370 A1  Aug. 29, 2019

(51) Int. Cl.
*H04L 29/06* (2006.01)
*H04L 29/08* (2006.01)

(52) U.S. Cl.
CPC ...... *H04L 63/1458* (2013.01); *H04L 63/1416* (2013.01); *H04L 67/12* (2013.01)

(58) Field of Classification Search
CPC ......... H04L 63/08; H04L 47/10; H04L 67/12; H04L 63/1458; H04L 63/1416; G06F 21/6218
See application file for complete search history.

(56) References Cited

U.S. PATENT DOCUMENTS

| 8,984,113 | B2 | 4/2015 | Li et al. |
| 9,319,404 | B2 | 4/2016 | Svigals |
| 9,485,231 | B1 | 11/2016 | Reese |
| 9,565,192 | B2 | 2/2017 | Chillappa et al. |
| 9,591,016 | B1 | 3/2017 | Palmieri et al. |
| 9,699,659 | B2 | 7/2017 | Zehavi et al. |
| 9,699,814 | B2 | 7/2017 | Zakaria et al. |
| 9,716,595 | B1 | 7/2017 | Kravitz et al. |
| 9,729,528 | B2 | 8/2017 | Zakaria et al. |
| 9,825,921 | B2 | 11/2017 | Reese |
| 9,875,510 | B1 | 1/2018 | Kasper |
| 10,251,053 | B1 | 4/2019 | Paczkowski |
| 2010/0031093 | A1* | 2/2010 | Sun ........................ G06F 21/552 714/45 |

(Continued)

FOREIGN PATENT DOCUMENTS

KR  2015033624 A  4/2015

OTHER PUBLICATIONS

"Securing the Internet of Things: A Proposed Framework," https://www.cisco.com/c/en/us/about/security-center/secure-iot-proposed-framework.html, Mar. 16, 2016.

(Continued)

*Primary Examiner* — Amir Mehrmanesh
(74) *Attorney, Agent, or Firm* — Weiss & Arons LLP; Michael A. Springs, Esq.

(57) ABSTRACT

A method is provided for preventing an IoT device within a trusted system from being harnessed in a malicious DDOS attack. The method may include bombarding the IoT device. The bombardment may originate from within the system, and may inundate the IoT device with harmless packets in a manner mimicking a traditional DOS attack. The inundating may utilize the resources of the IoT device to respond to the bombardment, and may thereby render the IoT device unavailable for fraudulent uses.

18 Claims, 7 Drawing Sheets

(56) References Cited

U.S. PATENT DOCUMENTS

| | | |
|---|---|---|
| 2013/0306276 A1* | 11/2013 | Duchesneau ......... G06F 9/5072 |
| | | 165/104.21 |
| 2015/0007273 A1* | 1/2015 | Lin ..................... H04L 63/08 |
| | | 726/4 |
| 2016/0028753 A1* | 1/2016 | Di Pietro ........... H04L 63/1425 |
| | | 726/23 |
| 2016/0173495 A1 | 6/2016 | Joo |
| 2016/0248746 A1 | 8/2016 | James et al. |
| 2016/0259937 A1 | 9/2016 | Ford et al. |
| 2016/0260095 A1 | 9/2016 | Ford |
| 2016/0337127 A1 | 11/2016 | Schultz et al. |
| 2016/0352685 A1 | 12/2016 | Park |
| 2016/0366181 A1 | 12/2016 | Smith et al. |
| 2017/0163444 A1 | 6/2017 | McLaughlin et al. |
| 2017/0289184 A1 | 10/2017 | C et al. |
| 2018/0253451 A1 | 9/2018 | Callan et al. |
| 2018/0309786 A1* | 10/2018 | Apelewicz .......... H04L 63/1466 |
| 2019/0172566 A1 | 6/2019 | Schulman et al. |
| 2019/0289454 A1 | 9/2019 | Inoue |
| 2019/0349190 A1 | 11/2019 | Smith et al. |

OTHER PUBLICATIONS

"Global Hacker Botnet tops 6 million hijacked devices," http://www.computerweekly.com/news/450427023/Global-hacker-botnet-tops-6-million-hijacked-devices, Sep. 27, 2017.

* cited by examiner

US 10,609,069 B2

REFLEXIVE BENIGN SERVICE ATTACK ON IOT DEVICE(S)

FIELD OF TECHNOLOGY

This application relates to Internet-of-Things (IoT) devices. Specifically, this application relates to the security of IoT devices, and preventing the use of IoT devices in malicious Distributed-Denial-Of-Service (DDOS) attacks.

BACKGROUND OF THE DISCLOSURE

Billions of devices worldwide are connected to the internet. These devices form the bulk of the Internet-of-Things (IoT). These devices may be quite simple and serve primarily as sensors. Such sensors may collect data by detecting and measuring physical quantities found in their respective environments. A connection to the internet may facilitate the conveyance of the data to other devices or applications. The devices or applications may store or act upon the data.

These IoT devices may range from relatively simple devices to more sophisticated computing devices. The simpler devices may present vulnerable targets to be hacked or otherwise attacked. The Distributed-Denial-Of-Service (DDOS) attack is a common hack exploiting IoT devices. In a DDOS attack, a great number of IoT devices may be enslaved, typically absent the knowledge of the IoT device's rightful owners. The DDOS attack harnesses the IoT devices to attack a computerized entity. In a typical attack, the enslaved IoT devices flood the targeted entity with packets, or requests. This flood may overwhelm the entity's resources and, effectively, shut it down.

It would thus be desirable for an IoT device to be resistant to exploitation and subjugation in malicious DDOS attacks.

SUMMARY OF THE INVENTION

A partially secure, internet-connected system, is provided. The system may include at least one Internet-of-Things (IoT) device. The IoT device may have sensor functionality. The sensor may measure, record, and/or transmit data regarding its environment. The IoT device may also include a mechanism for connecting to the internet. The connection to the internet may include a gateway node. The gateway node may include hardware and/or software, and may be connected, or otherwise coupled, to the IoT device and the internet. An element in the system may bombard the IoT device with harmless packets in a manner mimicking a traditional Denial-Of-Service (DOS) attack. This native, system-originated, bombardment may prevent the device from being harnessed in a malicious DDOS attack that does not originate natively in the system. The native bombardment may direct the IoT device's resources to be mostly or fully utilized in response to the native bombardment. When utilized in this manner, the IoT device's resources may be partially or fully inaccessible. When the IoT device's resources are partially or fully inaccessible, the IoT device may be secure from exploitation in a malicious DDOS attack.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
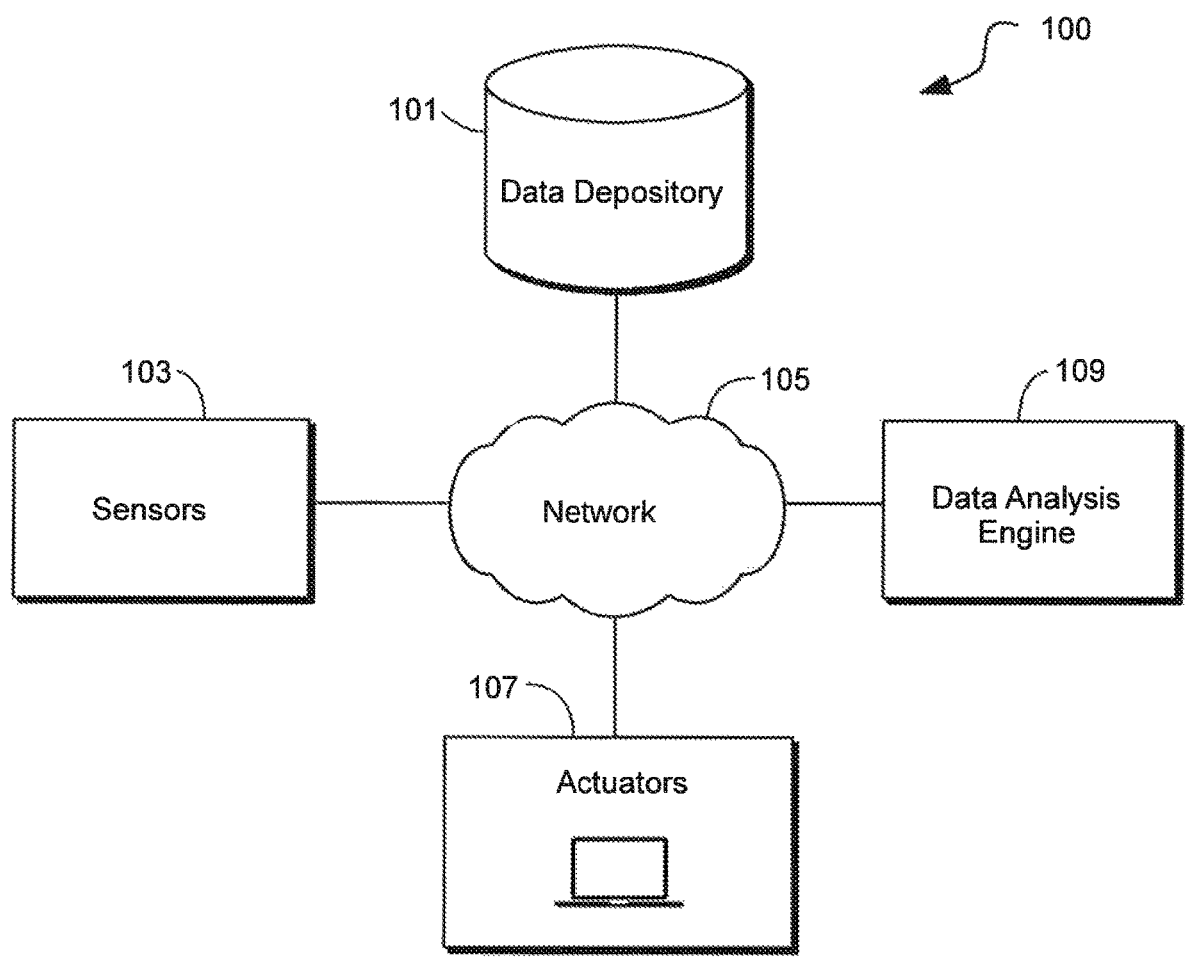
FIG. 1 shows an illustrative system in accordance with principles of the disclosure.

The Internet-of-Things (IoT) is the global network consisting of billions of devices coupled to the internet. Many of these devices are simple in their function and architecture. Many IoT devices have sensor functionality to measure, record, and/or transmit data regarding their environment.

A major security concern for IoT devices involves Distributed-Denial-Of-Service (DDOS) attacks. A basic Denial-Of-Service (DOS) attack involves one or more devices inundating a target computerized entity with communications. The inundation may adversely affect the functionality of the target entity. In a DDOS attack, a malicious actor may gain illicit access to, and control of, many devices that are coupled to the internet. Some or all of these devices may be IoT devices. The malicious actor may use malware to enslave the devices. The enslaved devices may be known as bots. A network of bots is known as a botnet. The malicious actor may be able to control the botnet in a coordinated manner. Once the devices are enslaved, the malicious actor may direct the devices to communicate with the targeted entity. This direction may cause an inordinately high level of communications to inundate the targeted entity. The inundation may overwhelm the target entity to the point of the entity losing some or all of its functionality.

The DDOS attack may provoke the sending of a large number of packets to the target. A packet may be a sequence of bits representing data. The data may include a payload to be communicated, as well as overhead data, which may include addresses of origin and/or addresses of destination. The packet may also contain one or more forms of security features, as well as error detection or error correction functionality.

The DDOS attacker may use amplification techniques. Amplification techniques multiply the data sent by the botnet. When the data is multiplied, the target is inundated with many more packets than the botnet sent out. This may create a very powerful attack.

The intensity of a DDOS attack can vary greatly. A small attack may direct a relatively small number of bits per second (bps) at the target. This may be enough to disrupt a small website or server. A larger attack may exceed 1 terabit per second (Tbsp). For example, in 2016, Mirai malware was used to create massive botnets containing hundreds of thousands of IoT devices. These botnets contributed to multiple major DDOS attacks. One attack targeted DYN, an internet Domain Name System (DNS) provider. DYN's services contribute to the smooth flow of traffic throughout the internet. The cyber-attack on DYN caused major internet platforms and services to be unavailable to large parts of Europe and North America. The DYN attack may have sustained a data rate as high as 1.2 Tbsp.

In a DDOS attack, each enslaved device may be directed to send a certain number of packets. The actual number may vary greatly depending on certain factors. Some of those factors may be the size of the target entity and the size of the botnet. For a large target, many packets must be sent to overwhelm it. Inversely, the larger the botnet, each bot must send fewer packets. It may be possible that, given a large enough botnet relative to the size of the target, each bot need not send more than one packet to devastate the target.

A partially secure, internet-connected system is provided. The system preferably includes at least one IoT device. The system may include a mechanism for coupling the IoT device to the internet. The coupling may include a gateway node. The gateway node may include hardware and/or software. The gateway node may be a separate node coupled to the IoT device. The gateway node may be incorporated within the physical bounds of the IoT device itself. The gateway node may be coupled to the device as well as the internet. The gateway node should be able to communicate separately with the device and the internet. The gateway node may also act as a middleman to convey messages in both directions between the device and the internet. The method of communication employed by the gateway node may be uniform across all channels, or it may use different methods depending on the device with which it is communicating. For example, the gateway node may be coupled to the internet with a physical cable or a wireless coupling such as Wi-Fi. The same gateway node may send messages to an IoT device with Bluetooth or ZigBee, or another suitable protocol.

An IoT device in the disclosed system resists exploitation in a DDOS attack, for the reasons that follow.

An element in the system may bombard the IoT device with harmless packets in a manner mimicking a traditional Denial-Of-Service (DOS) attack. This native, system-originated, bombardment may direct the IoT device's resources to be mostly or fully utilized in response to the native bombardment. When utilized in this manner, the IoT device's resources may be unavailable. The device resources may include the available bandwidth. The resources may also include processing power. When the IoT device's resources are unavailable, the IoT device resists exploitation in a malicious DDOS attack.

The native, system-originated, bombardment may alternatively be referred to as a self-initiated benign service attack. The service attack may be generated from an internal device. The service attack may include a server.

An element in the system may control the bombardment. The controlling element may control the intensity of the bombardment. The controlling element may select the bombarding element. The controlling element may communicate the instruction to bombard to one or more elements in the system.

The controlling element may contain a processing engine or processing circuit. The controlling element may be predetermined, or it may follow a dynamic algorithm. The controlling element may employ Artificial Intelligence (AI) or Machine Learning (ML) technologies.

The level of bombardment required to mostly or fully utilize a device's resources may depend on the device, and the communication protocol the device employs. For example, ZigBee, a technology that conforms to the IEEE 105.15.4 standard, supports maximum data transfer rates of 20 kilobits per second (kbps) at 868 MHz, 40 kbps at 915 MHz, and 250 kbps at 2.4 GHz. ZigBee supports packets with a size of 128 bytes. A byte is 8 bits, so the packet size may be 1024 bits. A device using ZigBee at 868 MHz will be 76.8% utilized when communicating at 15 packets per second. This information is derived from the following calculation. 15 packets take up 15,360 bits, and 15,360 is 76.8% of 20,000. The system may desire a bombardment level that utilizes 76.8% of the IoT device's resources. If the IoT device is using ZigBee at 868 MHz, a 76.8% utilization will be achieved if the IoT device is bombarded with 15 packets per second.

The system may desire a low level of bombardment. The low-level mode of bombardment may still allow the IoT device to send a number of communication packets aside from the bombardment. The number of packets allowed may be a threshold controlled by the system. The establishment of the threshold may be a predetermined setting, or it may depend on a dynamic algorithm. The low-level bombardment may still provide a degree of protection against some forms of DDOS. The IoT device may still be protected against a DDOS that directs its bots to send more packets than the IoT device is able to send. The system may dictate the precise amount of resources that low-level bombardment should leave available. For example, a low level of bombardment may leave available 10% of the IoT device's resources.

The system may desire a high level of bombardment. The high-level mode of bombardment may prevent the IoT device from sending any packets. The prevention of all packets may be achieved by bombarding the IoT device with a relatively large amount of data. The large data communication may not leave any resources available to send even one packet. If the IoT device cannot send any packets, it may be fully protected from being enslaved to act as part of a DDOS attack.

In some embodiments, the system may set the intensity of the bombardment in accordance with the resources necessary for maintaining a predetermined level of core functionality of the IoT device. The system may be further set to a low-level or high-level of bombardment. For example, if the core functionality of the IoT device requires 40% of the maximum data transfer rate, the bombardment may be set to 60%. That would not allow any packets out, constituting high-level bombardment. To achieve low-level bombardment, the system might be set to 50%, keeping 10% of the IoT device resources available.

The system may further include the ability to dynamically regulate the bombarding element to adjust the level of its bombardment proportional to the instantaneous desired functionality of the IoT device. This device functionality may change autonomously based on time or circumstance, or manually by an authenticated user request. In this embodiment as well, the system may be further set to a low-level or high-level bombardment. For example, in one instance, the device may require 60% of its performance capability. This resource requirement may limit the bombardment level to 40% with high-level mode, and 30% with low-level mode. This example assumes a low-level setting that allows a 10% threshold of device resources to remain available. Subsequently, upon the user's request to perform another task, the device may require only 20% of its resources. The bombardment level may then approach 80% with high-level mode, and 70% with low-level mode.

The system may also be configured to dynamically regulate the level of bombardment proportional to the instantaneous available power, or the level of stored power, in the IoT device. For example, when operating with full power, the bombardment might be set to a high-level, utilizing 100% of the device's resources. When operating at 30% power, however, it might be preferable to minimize the bombardment to a low-level. The low-level may be to utilize 50% of the IoT device's resources. Such an approach may provide some degree of protection without excessively degrading the device's power profile.

In certain embodiments, it may be preferred that, when the system is communicating within a protected network, and the IoT device may be secure from being compromised, the bombardment is toggled to an off configuration. The IoT device may be considered secure if the gateway node has security features in place to block suspicious requests for access that originate through the internet.

In some embodiments, the gateway node may perform the bombardment on the IoT device. In another embodiment, the IoT device may perform the bombardment on itself. In yet another embodiment, the system may include multiple IoT devices within a trusted network, and each IoT device may be an element performing a bombardment on itself or on one or more fellow IoT devices within the trusted network.

The system may, optionally, further include power-saving configurations. One such power-saving configuration may include limiting of the bombardment to exclusively take place when the IoT device is active with respect to its core functionality. At all other times the bombardment may be toggled to an off configuration, and the IoT device may be off-limits for some or all uses.

Another power-saving configuration may include conveying the bombardment to the IoT device using a low-power, short-range communications protocol. It may be preferred to utilize IEEE 802.15.4 or Bluetooth Low Energy (BLE) as the low-power, short-range communications protocol.

A method of preventing an IoT device within a trusted system from being harnessed in a malicious DDOS attack is provided. The method may include bombarding the IoT device with harmless packets. The bombardment may originate from an element within the system. The bombardment may inundate the IoT device in a manner mimicking a traditional DOS attack. The inundation may direct the resources of the IoT device to respond to said bombardment. When its resources are directed in this way, the IoT device is rendered unavailable for fraudulent uses.

The method may be preferred to establish the intensity of the bombardment in accordance with the resources necessary for maintaining a predetermined level of core functionality of the IoT device. The method may be configured for a relatively high level of bombardment. Alternatively, the method may be configured for a relatively low-level bombardment.

In some embodiments, the method may further allow for dynamically adjusting the level of bombardment in a manner proportional to the instantaneous desired functionality of the IoT device. This functionality may change autonomously based on time or circumstance, or manually by an authenticated user request. The method may be configured for a high level of bombardment. Alternatively, the method may be configured for low-level bombardment.

Another embodiment of the method may feature dynamically adjusting the level of bombardment in a manner proportional to the instantaneous available power in the IoT device. This method too, can be configured for high-level or low-level bombardment.

In some embodiments, the method may include the toggling of the bombardment to an off configuration when the IoT device is secure from the threat of being compromised. The IoT device may be considered secure when the system is communicating within a protected network. This toggling may conserve the power of the system.

Another aspect of the method may further include the ability to exclusively toggle the bombardment to an on configuration when the IoT device is active with respect to its core functionality. At all other times the bombardment may be toggled to an off configuration, and the IoT device may be considered off-limits for some or all uses. This toggling may reduce the power consumption of the system.

Another configuration of the method may include the conveying of the bombardment to the IoT device using a low-power, short-range communications protocol. The method may be preferred to implement the low-power, short-range communications protocol with IEEE 802.15.4 or Bluetooth Low Energy (BLE).

In one embodiment, a partially secure, internet-connected system is provided. The system may include at least one Internet-of-Things (IoT) device. The IoT device may have sensor functionality to measure, record, and/or transmit data regarding its environment. The system preferably comprises the coupling of the IoT device to the internet. The coupling may be facilitated or obtained using a gateway node. The gateway node may comprise hardware and/or software. The gateway node may be a separate node coupled to the IoT device, or it may be incorporated within the physical bounds of the IoT device itself. The gateway node may be coupled to the device as well as the internet. The gateway node should be able to communicate with the device and the internet separately. The gateway node should also be able to act as a middle-man to convey messages bidirectionally between the device and the internet. The method of communication employed by the gateway node may be uniform across all channels, or it may use different methods depending on the device with which it is communicating. For example, the gateway node may be coupled to the internet with a physical cable or Wi-Fi, while it may send messages to the IoT device with Bluetooth or ZigBee. The gateway node in the system may broadcast a message indicating that the IoT device is fully utilized, thereby creating the outward-facing perception of unavailability of resources. This perception may prevent the device from being exploited in a malicious DDOS attack.

An embodiment of the system may include an authenticated application connected to the gateway node via the internet. The application may take the form of a program on a mobile phone. The system may include a configuration where, in response to receipt of a request from an outside source over the internet to access the IoT device, the gateway node communicates with the application. The communication may request further instructions whether or not to continue broadcasting the perception of unavailability of resources.

The system may be applied to browsers as well. An application may create the outward-facing perception of unavailability of resources. The application may use a plug-in to provide this outward-facing perception. When a user visits a website on a device, the website may attempt to download a file to the device. As a default safety precaution, the plug-in may insert itself into that process. Irrespective of whether the device actually has sufficient storage space for the download, the plug-in may communicate that the device has no storage space for the download. This may prevent the download from occurring. The plug-in may then direct a pop-up window to appear on the device screen. The pop-up window may request further instructions from the user. This configuration may help prevent the download of unwanted, malicious software.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows illustrative system architecture 100. Architecture 100 may represent an internet of things ("IoT"). A differentiator between IoT and conventional networks may be a traffic profile. In an IoT, nodes may not have defined or known network positions, communication protocols or security services.

Architecture 100 may include nodes. Each node may include two or more nodes. FIG. 1 shows exemplary nodes 101, 103, 105, 107 and 109. The architecture includes sensors 103. Sensors 103 may include devices that detect changes in a physical or virtual environment. For example, sensors may measure audio, rainfall, temperature or water levels. Sensors may measure electronic network traffic, electronic signals (e.g., input or output) or frequency of user logins from within a predefined geographic area.

Sensors may be any suitable size. For example, sensors may be a few millimeters in size. Sensors may be deployed in a wide variety of locations. For example, sensors may be deployed in military battlefields, industrial plants, in orchards, in clothing, automobiles, smart phones, jewelry or refrigerators. Sensors may be relatively inexpensive and have low energy consumption. Sensors may "sense" two or more stimuli or environmental changes.

Sensors may implement two or more functions. For example, sensors may measure changes in their native environment, capture data related to the measured changes store and communicate the captured data. Sensors may be accessed by other sensors or any other node. Sensors may transmit captured data to another node. Sensors may broadcast captured data to two or more nodes.

Captured data may be transmitted using any suitable transmission method. For example, data captured by a sensor may be extracted by a mobile phone. Sensors may leverage a communication link provided by a mobile phone to communicate captured data to another node.

Each sensor may be a node and each sensor may be assigned a unique identifier. For example, sensors may be identified by one or more radio frequency identification ("RFID") tags. The RFID tag may be stimulated to transmit identity information about the sensor or any other information stored on the RFID tag.

Captured data may be transmitted by the sensor and processed far from the location of the sensor that captured the data. For example, captured data may be transmitted from one node to another node until the captured data reaches data repository 101.

Sensors maybe positioned and capture data from diverse locations. Locations may include geographic locations or virtual locations on electronic networks. Captured data may be transmitted to a location where information is needed for decisioning or consumption, which may not be the same place the data was captured or generated. Data synchronization protocols and caching techniques may be deployed to ensure availability of information at, or delivery to, a desired node. For example, a location where data is captured may not have continuous reliable network connectivity. Accordingly, captured data may be stored locally on the sensor for an amount of time prior to transmission or broadcast to another node.

Contextually, captured data may provide information not only about the physical environment surrounding a sensor, but the capturing of data from multiple sensors may provide data that signifies an event. Sensors may be grouped. Sensors may be grouped based on physical proximity or based on the content (or expected content) of data captured. Sensors may be grouped virtually. Other nodes, such as data analysis engine 109 may create and/or be included in such groups. In some embodiments, the captured data may be organized by data repository 101.

Based on data captured from sensors 103, actuators 107 may respond to a detected event. Based on the capture and analysis of multiple sources of data, actuators 107 may be instructed to take action without human intervention.

Generally, sensors and other nodes that form part of architecture 100 may include a processor circuit. The processor circuit may control overall operation of a node and its associated components. A processor circuit may include hardware, such as one or more integrated circuits that form a chipset. The hardware may include digital or analog logic circuitry configured to perform any suitable operation.

A processor circuit may include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Machine-readable memory may be configured to store, in machine-readable data structures: captured data, electronic signatures of biometric features or any other suitable information or data structures. Components of a processor circuit may be coupled together by a system bus, wirelessly or by other interconnections and may be present on one or more circuit boards. In some embodiments, the components may be integrated into a single chip. The chip may be silicon-based.

The node may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor for enabling a node to perform various functions. For example, the non-transitory memory may store software applications used by a node, such as an operating system, application programs, and an associated database. Alternatively, some or all of computer executable instructions of a node may be embodied in hardware or firmware components of the node.

Software application programs, which may be used by a node, may include computer executable instructions for invoking user functionality related to communication, such as email, short message service ("SMS"), and voice input and speech recognition applications. Software application programs may utilize one or more algorithms that request alerts, process received executable instructions, perform power management routines or other suitable tasks.

As shown in FIG. 1, a node may operate in a networked environment. A node may be part of two or more networks. A node may support establishing network connections to one or more remote nodes. Such remote nodes may be sensors, actuators or other computing devices. Nodes may be personal computers or servers. Network connections may include a local area network ("LAN") and a wide area network ("WAN"), and may also include other networks. When used in a LAN networking environment, a node may be connected to the LAN through a network interface or adapter. The communication circuit may include the network interface or adapter.

When used in a WAN networking environment, a node may include a modem or other circuitry for establishing communications over a WAN, such as the Internet. The communication circuit may include the modem.

The existence of any of various well-known protocols such as TCP/IP, Ethernet, FTP, HTTP and the like is presumed, and a node can be operated in a client-server configuration to permit a user to retrieve web pages from a web-based server. Web browsers can be used to display and manipulate data on web pages.

Nodes may include various other components, such as a battery, speaker, and antennas. Network nodes may be portable devices such as a laptop, tablet, smartphone, "smart" devices (e.g., watches, eyeglasses, clothing having embedded electronic circuitry) or any other suitable device for receiving, storing, transmitting and/or displaying relevant information.

A node may include a display constructed using organic light emitting diode ("OLED") technology. OLED technology may enhance functionality of a node. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display power must be supplied to the entire backlight, even to illuminate just one pixel in the display. In contrast, an OLED display does not necessarily include a backlight. Furthermore, in an OLED display, preferably, only the illuminated pixel draws power.

The power efficiency of OLED technology presents a possibility for designing nodes that provide enhanced security and functionality. Illustrative devices that may be constructed using OLED technology are disclosed in U.S. Pat. No. 9,665,818, which is hereby incorporated by reference herein in its entirety.

A node may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, "smart" devices (e.g., watches, eyeglasses, clothing having embedded electronic circuitry) mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Nodes may utilize computer-executable instructions, such as program modules, being executed by a computer. Generally, program modules include routines, programs, objects, components, data structures, etc. that perform particular tasks or implement particular abstract data types. A node may be operational with distributed computing environments where tasks are performed by remote processing devices that are linked through a communications network. In a distributed computing environment, program modules may be located in both local and remote computer storage media including memory storage devices. Nodes may rely on a network of remote servers hosted on the Internet to store, manage, and process data (e.g., "cloud computing").

Nodes may include a battery. The battery may be a power source for electronic components of the node. For example, the battery may supply power to the display, the communication circuit and the processor circuit. In some embodiments, a node may include a plurality of batteries. Nodes may include solar panels that convert solar energy into electricity that powers one or more components of a node.

Sensors in a single architecture or other grouping may be produced by different manufacturers. Sensors may capture data in different formats. For example, sensors may use different data structures to package captured data. Sensors 103 may utilize different communication protocols to transmit captured data or communicate with other nodes. Despite such operational differences, sensors 103 may operate substantially seamlessly together. Interoperability may allow captured data to be substantially seamlessly captured and interpreted by data analysis engine 109. Based on interpreting the captured data, data analysis engine 109 may issue instructions to actuators 107.

Interoperability may be implemented across any suitable nodes of architecture 100. Interoperability may enable communication between sensors 103 and other nodes. Interoperability may enable architecture 100 to provide services and applications via actuators 107. Interoperability may allow services and content to be provided anywhere, anytime and based on input/output of different nodes.

Data gathering by one or more of sensors 103 may be controlled by one or more other nodes of architecture 100. For example, data analysis engine 109 may control a quantity of data captured by sensors 103. Alternatively, data repository 101 and/or analysis engine 109 may filter or otherwise intelligently process data captured by sensors 103.

Timing of when data is captured by sensors 103 may be controlled by any suitable node on architecture 100. For example, data may be captured in real-time or at pre-defined intervals such as once a day. Data may also be captured in response to a detected environmental status change.

Data analysis engine 109 may filter data captured by sensors 103. Data analysis engine 103 may repackage or reformat captured data. Data conversion may include transformation of low level raw data (possibly from multiple sensors or groups of sensors) into meaningful information for a target audience or for a target analysis.

For example, captured data intended for human consumption or interaction may be converted into a human understandable format. Captured data intended for machine consumption may be converted into a format readable by a particular machine or node.

Data analysis engine 109 may perform pattern recognition to identify correlations and trends in captured data. Data analysis engine 109 may also evaluate a cost of obtaining data. "Costs" may be monetary (e.g., labor costs or infrastructure costs), time-related or related to a level of intrusion needed to obtain desired data. "Costs" may be bandwidth-related.

For example, a communication link may be associated with a fixed bandwidth. The bandwidth may limit an amount of information or a rate of transmission over the communication link.

For example, a sensor may respond slowly to a request from another node if there is a large amount of informational traffic traveling on a communication link shared with other nodes. The large amount of informational traffic may not leave sufficient bandwidth for the transmitting node to timely communicate with the requesting node.

As a further example, a sensor may respond slowly if the sensor transmits a large amount of captured data. The large amount of information transmitted by the sensor, together with other informational traffic traveling on the shared communication link, may be close to, or exceed the bandwidth of the communication link. As a result, sensors may be unable to transmit captured date in a timely manner.

Data travelling within architecture 100 to/from nodes may be routed along multiple communication links until the transmitted information reaches a desired destination node (e.g., data analysis engine 109). Each communication link may service a number of connected nodes and a respective volume of informational traffic.

It may be difficult to ascertain available bandwidth on a particular communication link. It may be difficult to ascertain which communication links are being utilized to transmit information between nodes. Nodes attempting to transmit information over a communication link may not be aware of a number of connected nodes, a volume of traffic on a particular communication link or a bandwidth capacity of a communication link.

Furthermore, a communication link may be controlled by a different entity from an entity responsible for operation of a particular node. The entity responsible for operation of the node may be unable to monitor a number of nodes that share a communication link, a bandwidth capacity of a communication link or a volume of traffic transmitted on a communication link. Despite difficult to predict conditions on a communication link, it would be desirable for a node to timely respond to a request for information or timely receive desired information.

Sensors 103 may belong to, or be operated by, different administrative/management domains. Sensors 103 may be operated by different domains without expressly-defined relationships among such domains. The absence of express relationships enables access to data captured by sensors 103 by one or more architectures having one or more features in common with architecture 100. Groups of sensors may include sensors from two or more administrative domains.

Data repository 101 may receive data captured by sensors 103. In some embodiments, data captured by sensors 103 may be transmitted directly to data analysis engine 109. Data stored in repository 101 may be sorted and analyzed by data analysis engine 109. Data stored in data repository 101 may be so voluminous and complex (e.g., structured/unstructured and/or constantly changing) that traditional data processing application software may be inadequate to meaningfully process the data (e.g., "big data"). Data analysis engine 109 may include software applications specially designed to process large volumes of data ("big data analytics").

Based on captured data, data analysis engine 109 may optimize processes, reduce loss (e.g., fraud), improve customer understanding and targeting, increase automation, decrease latency in products and/or services provided by actuators 107 and identify new analytical models that may utilize data captured by sensors 103.

Architecture 100 may include one or more layers of software applications. Software applications may implement a variety of functions and provide varied services to nodes of architecture 100. Software applications running on data analysis engine 109 may submit requests to sensors 103 for retrieval of specific data to achieve a functional goal provided by actuators 107. Software applications may control data captured by sensors 103 or actions taken by actuators 107. Software applications may control a flow of information within architecture 100.

Software applications may be implemented on a node. A node may be an enterprise system or a "cloud" of computing devices. On device applications may be dependent on a specific hardware configuration. Such hardware requirements may preferably be minimal, such as an extension of the OS/firmware of the device. For example, illustrative software applications for sensors may include TinyOS, Linux, Contiki and RIOT.

Software applications may include middleware. Middleware may connect an operating system or database to other software applications. Middleware may configure and manage hardware such as sensors (e.g., to achieve a target functionality). Middleware may be responsible for aggregating data captured by sensors 103 and passing captured data to data repository 101 and/or data analysis engine 109.

Software applications may provide security services that mitigate threats to the integrity of data captured by sensors 103 or architecture 100 generally.

Actuators 107 may respond to data transmitted or processed by other nodes such as data analysis engine 109. Actuators 107 may include devices that modify the physical state of a physical entity. Actuators 107 may include devices that modify a virtual state of information. For example, actuators 107 may move (translate, rotate, etc.) physical objects or activate/deactivate functionalities of more complex ones. An actuator may dim a light bulb, open a door, change a temperature setting, authorize access to an automated-teller-machine ("ATM") and/or any other suitable functionality. Actuators 107 may verify identities, trigger electronic payments, extend credit or debit accounts.

Within an intelligent networked system such as architecture 100, sensors 103 perform the functions of input devices—they serve as, for example, "eyes," collecting information about their environment. In contrast, actuators 107 act as "hands," implementing decisions based on data captured by sensors 103. A single node may include the functions of sensors and actuators.

Actuators 107 may communicate with data analysis engine 109 and sensors 103. Actuators 107 may include an application programming interface ("API") for communicating with other nodes. Actuators 107 may communicate directly with other nodes using machine-to-machine ("M2M") protocols. Illustrative M2M protocols may include MQ Telemetry Transport ("MQTT"). M2M includes communication between two or more objects without requiring direct human intervention. M2M communications may automate decision and communication processes for actuators 107.

In the absence of express relationships between sensors and the devices that access data captured by the sensors traditional approaches for managing trust, security naming, discovery, or other traditional network services may not be applicable or available.

Generally, nodes of architecture 100 may interact and cooperate using one or more interaction paradigms. Exemplary interaction paradigms include client-server and peer-to-peer interactions. Illustrative communication protocols may include HyperText Transfer Protocol ("HTTP"), Simple Object Access Protocol ("SOAP"), REpresentational State Transfer ("REST") Constrained Application Protocol ("CoAP") or SensorML.

As a result of the disparate nature of sensors 103, an architecture, such as architecture 100 incorporating sensors 103, may support a variety of communication protocols. Illustrative supported protocols may include IEEE 802.15.4 ("ZigBee"), IEEE 802.11, Bluetooth Low Energy (BLE), 3G and 4G and LTE. For example, ZigBee requires approximately 20 to 60 mW (for 1 mW transmission power, a range of 10 to 100 meters and a data transmission rate of 250 kbit/s).

To conserve energy, a sensor may communicate wirelessly for short periods of time. Utilizing this approach, one or more standard size single cell cylindrical dry battery batteries (e.g., AA size) may provide requisite computing power and wireless communication for many months.

Communication protocols used by nodes (e.g., sensors or actuators) may not have, or may not be capable of having, security capabilities. A security layer or buffer may be implemented by nodes that receive or rely on data captured by insecure sensors. Sensors or other nodes may be dynamically added or removed from an architecture. A security layer or buffer may be modular to scale quickly and meet growth/contraction requirements.

A physical layer may physically link nodes of architecture 100. The function of this physical layer is to provide communication pathways to carry and exchange data and network information between multiple sub-networks and nodes.

Figure 2:
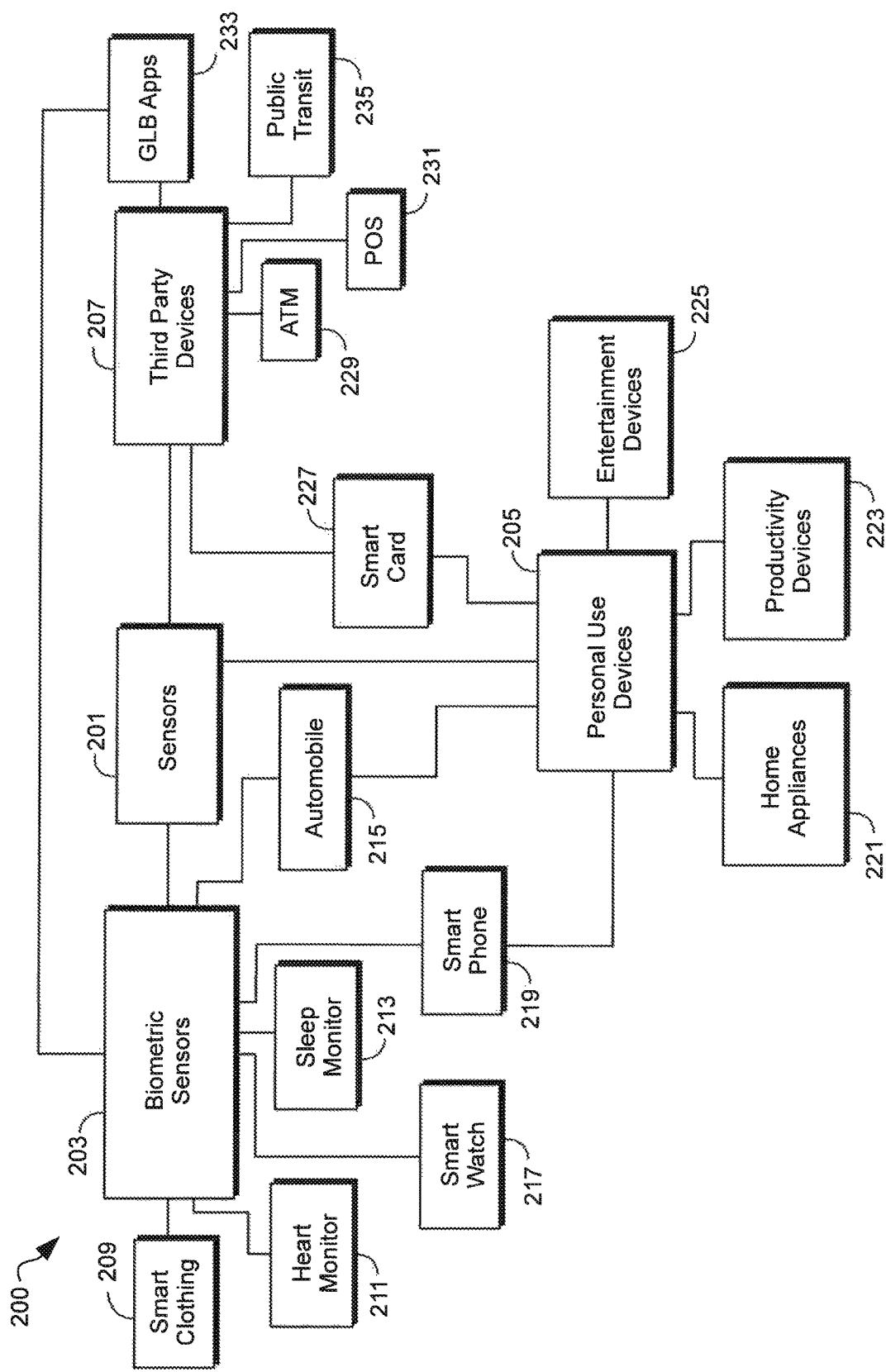
FIG. 2 shows another illustrative system in accordance with principles of the disclosure.

FIG. 2 shows illustrative sensors 200. Sensors 200 may include or more features of sensors 103 (shown in FIG. 1). Sensors 200 include biometric sensors 203 that sense biometric attributes. For example, biometric sensors may be embedded in "smart" clothing 209 that monitors a wearer's physical condition. Such clothing may capture biometric data, such as pulse rate, temperature, muscle contraction, heart rhythm and physical movement. Smart clothing may be linked to smart phone 219 such as via a Bluetooth® communication link. Smart phone 219 may transmit data captured by smart clothing 209 to one or more other network nodes.

Biometric sensors 203 may include other illustrative sensors such as heart monitor 211, sleep monitor 213, smart watch 219, smart phone 219 and automobile 215.

Sensors 200 may include personal use devices 205. Personal use devices 205 may include sensors embedded in home appliances 221, productivity devices 223 or entertainment devices 225. Productivity devices 223 may include tablets, laptops or other personal computing devices. Entertainment devices may include gaming consoles and the like.

Sensors 200 also include third-party devices 207. Third-party devices may include devices that are not under the direct or exclusive control of a user. A user may interact with third-party devices 207 to obtain a desired service provided by the third-party.

Exemplary third-party devices include smart card 227. Smart card 227 may function as a purchasing instrument. Illustrative purchasing instruments may conform to specifications published by the International Organization for Standardization. Such specifications may include: ISO/IEC 7810, ISO/IEC 7811 and ISO/IEC 7816, which are hereby incorporated herein by reference in their entireties. Suitable purchasing instruments may include a credit card, debit card and electronic purchasing devices. Such purchasing instruments may sense a location or frequency of use.

Such purchasing instruments may include "EMV" chips. EMV is a technology that derives its name from the companies (Europay, MasterCard, and Visa) that helped develop the technology. When the credit card and its associated EMV chip are inserted into a specialized card reader (another sensor), the reader powers the EMV chip and the EMV chip generates a new authorization code each time the credit card is used. The EMV chip may capture transaction data such as amounts, location or identity of the chip reader.

Third-party sensors 207 may include ATMs 229, point-of-sale terminals ("POS") 231 and public transit 235. Such devices may also be actuators.

Third-party devices may also include software applications 233. Applications 233 may be used to access services, such as an online banking portal. Such applications may detect biometric features to authorize access to the online banking portal. Third-party devices may include sensors that capture data associated with power consumption (e.g., smart grids), electronic communication traffic, logistics (package movement) or any other suitable environmental condition.

FIG. 2 shows that sensors may categorically overlap. For example, an application used to access an online bank portal may capture a biometric feature (e.g., fingerprint) to authenticate a user.

Each of the sensors shown in FIG. 2 may include different and possibly incompatible hardware. For example, sensors may each have different operating systems (or none at all), processor types and memory. Sensors 200 may be inexpensive, single-function devices with rudimentary network connectivity. Sensors 200 may be positioned in remote and/or inaccessible locations where human intervention or configuration is difficult.

To conserve power, sensors 200 may utilize 16-bit microcontrollers. Such microcontrollers may use less than 400 µW per MIPS ("million instructions per second") and may be capable of operating TCP/IPv6 stacks with 4 kB RAM and 24 kB flash memory. As outlined in proposed Internet standard RFC 4944, which is hereby incorporated by reference in its entirety, IPv6 may be implemented over IEEE 802.15.4 (e.g., ZigBee) based wireless communication standards.

Furthermore, because of potentially disparate features and characteristics of sensors 200, security solutions may be used to verify an authenticity of data transmitted by sensors having disparate hardware and software capabilities.

Figure 3:
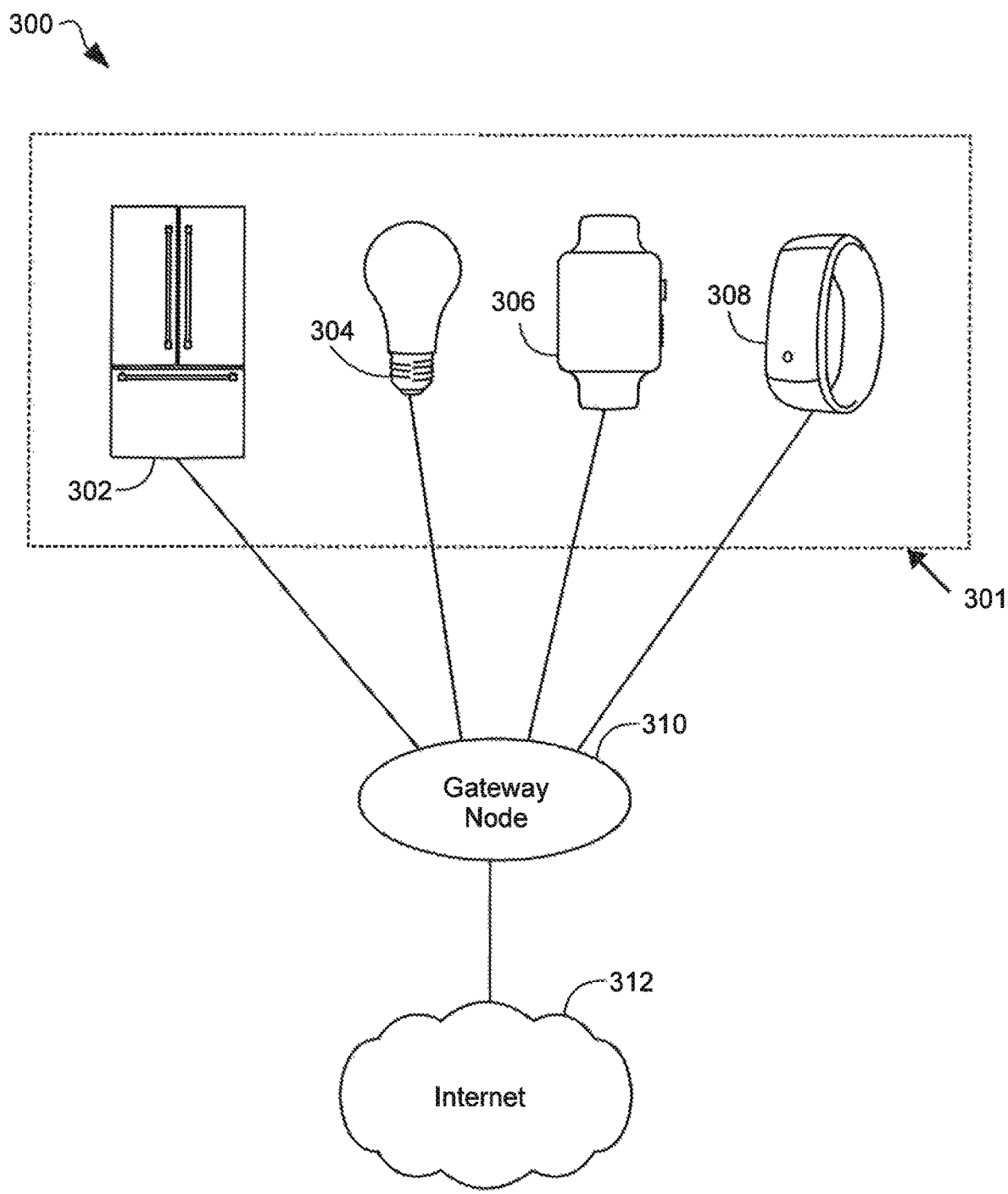
FIG. 3 shows another illustrative system in accordance with principles of the disclosure.

FIG. 3 shows an illustrative diagram according to certain embodiments of the disclosure. FIG. 3 is a schematic diagram of the architecture of a basic system 300. System 300 may include at least one IoT device, depicted in region 301. An IoT device may be in the form of a large appliance 302, such as a refrigerator, or a small appliance 304, such as a light bulb. Other examples of an IoT device may be a wearable accessory 306, such as a smart-watch, or a fitness-tracker 308.

The IoT devices in region 301 may be connected to a gateway node, 310. The gateway node 310 may be connected to the internet, 312. The gateway node 310 may facilitate communication between the IoT devices in region 301 and the internet 312.

Figure 4:
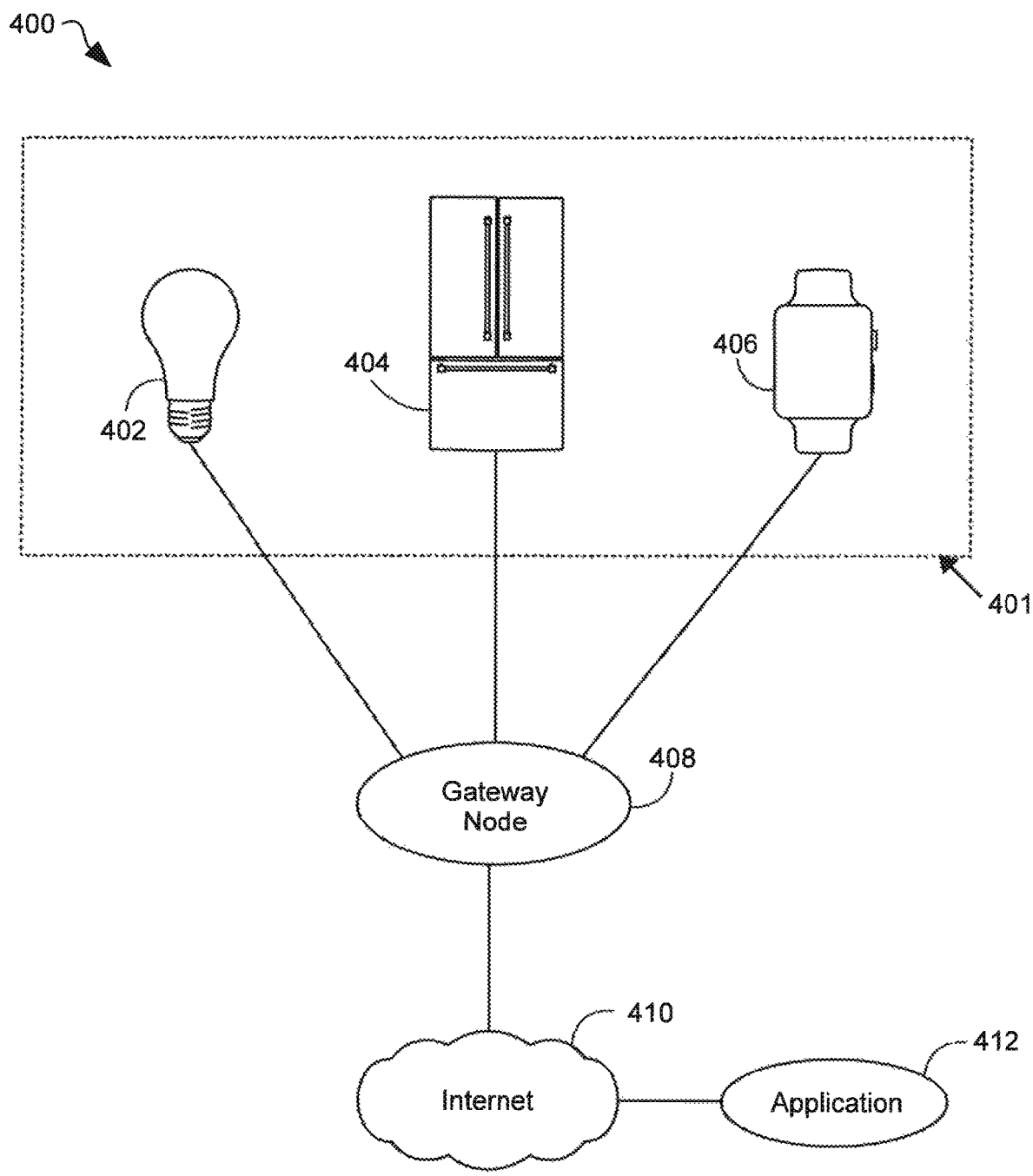
FIG. 4 shows another illustrative system in accordance with principles of the disclosure.

FIG. 4 shows an illustrative diagram according to certain embodiments of the disclosure. FIG. 4 is a schematic diagram of the architecture of a system 400. In system 400, IoT devices 402, 404, and 406, all depicted in region 401, may be connected to a gateway node, 408. The gateway node 408 may be connected to the internet 410. An application 412, such as a smart mobile phone, may be connected to the internet 410. The application 412 and the gateway node 408 may be able to communicate with each other via the internet 410.

Figure 5:
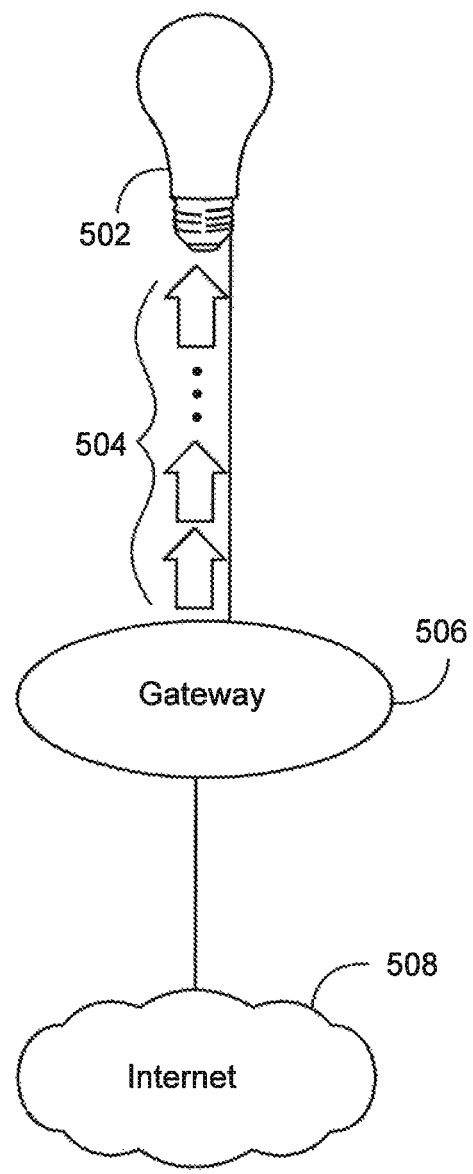
FIG. 5 shows another illustrative system in accordance with principles of the disclosure.

FIG. 5 shows an illustrative diagram according to certain embodiments of the disclosure. In system 500, IoT device 502 may be connected to a gateway node 506. Gateway node 506 may be connected to the internet 508. The gateway node 506 may bombard the IoT device 502 with a stream of packets, 504.

Figure 6:
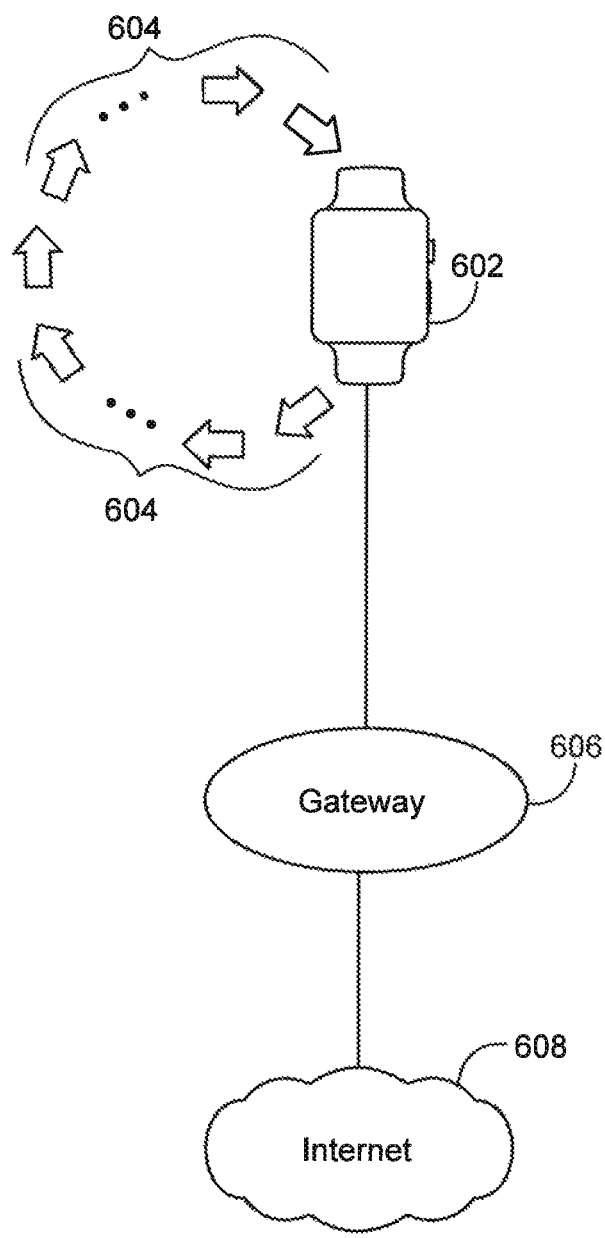
FIG. 6 shows another illustrative system in accordance with principles of the disclosure.

FIG. 6 shows an illustrative diagram according to certain embodiments of the disclosure. In system 600, IoT device 602 may be connected to a gateway node 606. Gateway node 606 may be connected to the internet 608. The IoT device 602 may bombard itself with a stream of packets, 604.

Figure 7:
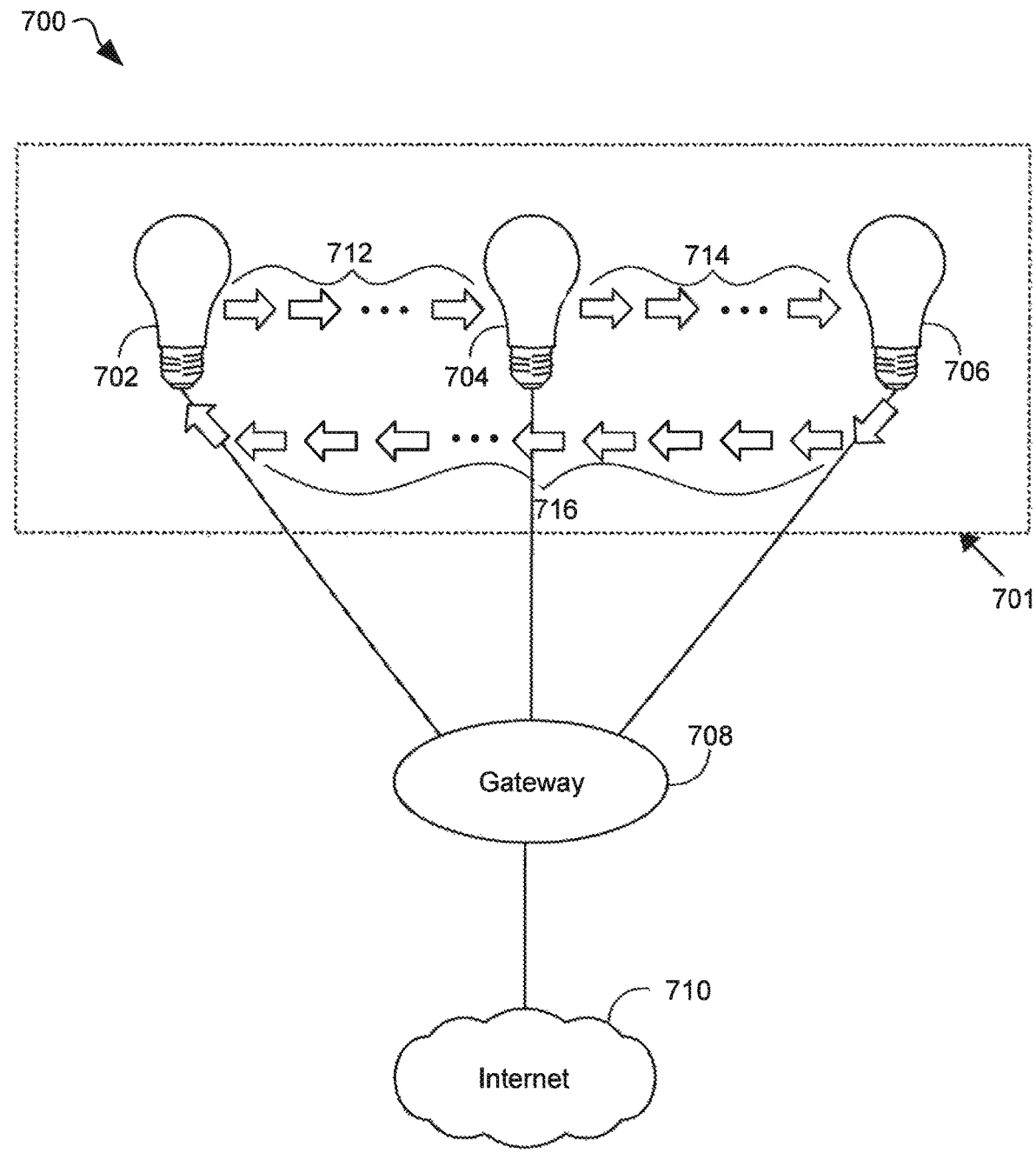
FIG. 7 shows another illustrative system in accordance with principles of the disclosure.

FIG. 7 shows an illustrative diagram according to certain embodiments of the disclosure. IoT devices 702, 704, and 706, all depicted in region 701, may be connected to a gateway node 708. Gateway node 708 may be connected to the internet 710. The IoT devices in region 701 may bombard each other with streams of packets. For example, IoT device 702 may bombard IoT device 704 with packet stream 712, IoT device 704 may bombard IoT device 706 with packet stream 714, and IoT device 706 may bombard IoT device 702 with packet stream 716.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and apparatus for securing an IoT device within an internet-connected system are provided. Persons skilled in the art will appreciate that the present invention can be practiced by other than the described embodiments, which are presented for purposes of illustration rather than of limitation, and that the present invention is limited only by the claims that follow.

What is claimed is:

1. A partially secure, internet-connected system, comprising:
   at least one Internet-of-Things (IoT) device;
   said IoT device comprising a connection to the internet;
   said connection to the internet comprising a gateway node;
   said gateway node comprising hardware and/or software, and connected to said IoT device and the internet;
   wherein an element of said system bombards the IoT device with communications packets in a manner mimicking a traditional Denial-Of-Service (DOS) attack;
   said bombardment directing the IoT device's resources to responding to the bombardment, said bombardment further comprising a dynamic low-level mode of bombardment, said low-level bombardment being established dynamically based on a current IoT device functionality, wherein the system preserves a first amount of resources necessary for the current IoT device functionality, said low-level bombardment utilizing a percentage of the resources remaining above said first amount of preserved resources, said percentage established to preserve a second amount of the remaining resources as available for use, said second amount sufficient to send a threshold number of communications packets per unit time, said low-level mode preventing the IoT device from sending more than the said threshold number of packets per unit time in a malicious DDOS attack, while maintaining the current device functionality;
   said directing of resources preventing the device from being harnessed in a malicious Distributed-Denial-Of-Service (DDOS) attack.

2. The system of claim 1, further comprising a high-level mode of bombardment, said high-level bombardment fully utilizing the IoT device's resources, such that the IoT device is prevented from sending even one maliciously-originated communications packet.

3. The system of claim 1, further comprising a low-level mode of bombardment, said low-level bombardment utilizing a percentage of the IoT device's resources, said percentage established to preserve a remaining amount of resources as available for use, said amount of resources sufficient to allow the IoT device to send a threshold number of communications packets per unit time, said low-level mode preventing the IoT device from sending more than the said threshold number of packets per unit time in a malicious DDOS attack.

4. The system of claim 1, further comprising a dynamic high-level mode of bombardment, said high-level bombardment being established dynamically based on a current IoT device functionality, wherein the system preserves the amount of resources necessary for the current IoT device functionality, said high-level bombardment fully utilizing the resources remaining above said amount of preserved resources, said dynamic high-level bombardment preventing the IoT device from sending any packets unnecessary for the current IoT device functionality, while maintaining the current device functionality.

5. The system of claim 1, wherein the level of bombardment is dynamically regulated to adjust in proportion to the instantaneous level of power available to the IoT device.

6. The system of claim 1, wherein, when the system is communicating within a protected network, and the IoT device is secure from being compromised, the bombardment is toggled to an off configuration.

7. The system of claim 1, wherein the gateway node is the element performing the bombardment on the IoT device.

8. The system of claim 1, wherein the IoT device is the element performing the bombardment on itself.

9. The system of claim 1, further comprising multiple IoT devices within a trusted network, wherein each IoT device is an element performing a bombardment on itself or on one or more fellow IoT devices within said trusted network.

10. The system of claim 1, wherein the bombardment is only toggled to an on configuration when the IoT device is active with respect to its core functionality, at all other times the bombardment is toggled to an off configuration, and the IoT device is considered off-limits for all uses, thereby reducing the power consumption of the system.

11. A method of preventing an Internet-of-Things (IoT) device within a trusted system from being harnessed in a malicious DDOS attack, comprising:
bombarding the IoT device;
said bombardment originating from an element within the system;
said bombardment inundating the IoT device with harmless packets in a manner mimicking a traditional DOS attack, said bombardment further comprising a dynamic low-level mode of bombardment, said low-level bombardment being established dynamically based on a current IoT device functionality, wherein the system preserves a first amount of resources necessary for the current IoT device functionality, said low-level bombardment utilizing a percentage of the resources remaining above said first amount of preserved resources, said percentage established to preserve a second amount of the remaining resources as available for use, said second amount sufficient to send a threshold number of communications packets per unit time, said low-level mode preventing the IoT device from sending more than the said threshold number of packets per unit time in a malicious DDOS attack, while maintaining the current device functionality; and
said inundating utilizing the resources of the IoT device to respond to said bombardment, thereby rendering the IoT device unavailable for fraudulent uses.

12. The method of claim 11, further comprising dynamically adjusting the level of bombardment in a manner proportional to the instantaneous desired functionality of the IoT device, said functionality changing autonomously based on time or circumstance, or manually by an authenticated user request.

13. The method of claim 11, further comprising establishing a dynamic high-level mode of bombardment, said establishing being dynamically based on a current desired IoT device functionality, said system preserving the amount of resources necessary for the current IoT device functionality, said high-level bombardment fully utilizing the resources remaining above said amount of preserved resources, said dynamic high-level bombardment preventing the IoT device from sending any packets unnecessary for the current IoT device functionality, while maintaining the current device functionality.

14. The method of claim 11, further comprising dynamically adjusting the level of bombardment in a manner proportional to the instantaneous level of power available to the IoT device.

15. The method of claim 11, further comprising toggling the bombardment to an off configuration when the system is communicating within a protected network, and the IoT device is secure from the threat of being compromised.

16. The method of claim 11, further comprising toggling the bombardment to an on configuration, only when the IoT device is active with respect to its core functionality, at all other times toggling the bombardment to an off configuration, and considering the IoT device off-limits for all uses, thereby reducing the power consumption of the system.

17. A partially secure, internet-connected system, comprising:
at least one Internet-of-Things (IoT) device that has sensor functionality to measure, record, and/or transmit data regarding its environment;
said IoT device comprising a connection to the internet;
said connection to the internet comprising a gateway node; and
said gateway node comprising hardware and/or software, and connected to said IoT device and the internet;
wherein said gateway node broadcasts a message indicating that said IoT device is fully utilized, thereby creating the outward-facing perception of unavailability of resources;
and wherein the system is configured to provide a dynamic low-level mode of bombardment, said low-level bombardment being established dynamically based on a current IoT device functionality, wherein the system preserves a first amount of resources necessary for the current IoT device functionality, said low-level bombardment utilizing a percentage of the resources remaining above said first amount of preserved resources, said percentage established to preserve a second amount of the remaining resources as available for use, said second amount sufficient to send a threshold number of communications packets per unit time, said low-level mode preventing the IoT device from sending more than the said threshold number of packets per unit time in a malicious DDOS attack, while maintaining the current device functionality.

18. The system of claim 17, further comprising an authenticated application connected to said gateway node via the internet, wherein, in response to receipt of a request from an outside source over the internet to access the IoT device, said gateway node communicates with said application, said communication requesting instructions whether or not to continue broadcasting the perception of unavailability of resources.

* * * * *